(12) United States Patent
Stommel

(10) Patent No.: US 7,994,650 B2
(45) Date of Patent: Aug. 9, 2011

(54) ROTOR BLADE AND WIND ENERGY INSTALLATION

(75) Inventor: Matthias Stommel, Ganderkesee (DE)

(73) Assignee: Daubner & Stommel GbR Bau-Werk-Planung (DE)

(*) Notice: Subject to any disclaimer, the term of this patent is extended or adjusted under 35 U.S.C. 154(b) by 323 days.

(21) Appl. No.: 12/201,030

(22) Filed: Aug. 29, 2008

(65) Prior Publication Data

US 2009/0236857 A1 Sep. 24, 2009

(30) Foreign Application Priority Data

Sep. 3, 2007 (DE) .......................... 10 2007 041 649

(51) Int. Cl.
*F03D 9/00* (2006.01)
(52) U.S. Cl. .............................. 290/44; 290/55; 416/88
(58) Field of Classification Search .................... 290/44, 290/55; 416/87–89, 225, 239, 132 B
See application file for complete search history.

(56) References Cited

U.S. PATENT DOCUMENTS

| | | | | |
|---|---|---|---|---|
| 2,074,149 A * | 3/1937 | Jacobs | ............................ | 416/88 |
| 4,297,076 A | 10/1981 | Donham et al. | | |
| 4,355,955 A * | 10/1982 | Kisovec | ......................... | 416/23 |
| 4,533,297 A * | 8/1985 | Bassett | ..................... | 416/132 B |
| 4,715,782 A | 12/1987 | Shimmel | | |
| 5,253,979 A * | 10/1993 | Fradenburgh et al. | .... | 416/223 R |
| 6,902,370 B2 * | 6/2005 | Dawson et al. | ................ | 415/4.1 |
| 7,186,086 B2 * | 3/2007 | Yoshida | .................... | 416/146 R |
| 2006/0093483 A1 * | 5/2006 | Brueckner | ................ | 416/132 B |
| 2008/0124216 A1 * | 5/2008 | Liao | ................. | 416/24 |

FOREIGN PATENT DOCUMENTS

| | | |
|---|---|---|
| DE | 9 17 540 B | 9/1954 |
| DE | 197 30 211 A1 | 12/1997 |
| DE | 103 32 875 A1 | 2/2005 |
| WO | 2006/133715 A1 | 12/2006 |

OTHER PUBLICATIONS

DE Search Report, Sep. 12, 2008.

* cited by examiner

*Primary Examiner* — Tho D Ta
(74) *Attorney, Agent, or Firm* — Laurence P. Colton; Smith Risley Tempel Santos LLC

(57) ABSTRACT

A rotor blade for a wind energy installation, in which the rotor blade (22) is formed in a plurality of parts, preferably in two parts, with respect to the rotor blade longitudinal direction, in particular in order to temporarily reduce the longitudinal extent of the rotor blade (22) during rotor blade transportation, such that the individual rotor blade segments (24, 26) can be fitted to one another, one behind the other in the longitudinal direction, for assembly of the rotor blade (22), such that in each case at least two rotor blade segments (24, 26) can be connected to one another such that they cannot rotate or such that they can rotate with respect to one another, with the individual rotor blade segments (24, 26) each having one or more suitable contact surfaces (28, 30) which rest directly or indirectly on one another in the assembled state of the rotor blade (22), and such that at least one of the individual rotor blade segments (24, 26) can be tensioned by means of a tensioning apparatus, which can preferably be controlled and/ or regulated, in the direction of the rotor center of a wind energy installation (10), and/or can be attached indirectly or directly in a stressed manner to another rotor blade segment (24, 26) and/or to the blade connection and/or to the hub (20) and/or to some other component of a wind energy installation (10).

15 Claims, 2 Drawing Sheets

ROTOR BLADE AND WIND ENERGY INSTALLATION

STATEMENT OF RELATED APPLICATIONS

This patent application is based on and claims priority under 35 USC 119 on German Application No. 10 2007 041 649.2 having a filing date of 3 Sep. 2007, which is incorporated herein in its entirety by this reference.

BACKGROUND OF THE INVENTION

1. Technical Field

The present invention relates to a wind energy installation and to a rotor blade for a wind energy installation.

2. Related Art

Rotor blades are now being constructed with ever larger dimensions. Particularly, but not exclusively, in the case of very large rotor blades, specifically very long rotor blades, one problem that frequently occurs is in transporting these rotor blades to the building site, specifically to the location where the wind energy installation is being installed. The rotor blades are generally transported on heavy goods vehicles which are specifically equipped in an appropriate manner. In the past, the use of transport ships, heavy-load helicopters or the like has also been considered or implemented. The immense length of the rotor blades, in particular, frequently presents problems in this case.

BRIEF SUMMARY OF THE INVENTION

Against the background of this prior art, one object of the present invention is to specify a rotor blade for a wind energy installation which simplifies its transport to the building site for the wind energy installation. A further aim is to specify a wind energy installation which can be equipped with a rotor blade such as this.

This object is achieved by a rotor blade for a wind energy installation, in which the rotor blade is formed in a plurality of parts, preferably in two parts, with respect to the rotor blade longitudinal direction, in particular in order to temporarily reduce the longitudinal extent of the rotor blade during rotor blade transportation, such that the individual rotor blade segments can be fitted to one another, one behind the other in the longitudinal direction, in order to assemble the rotor blade, such that in each case at least two rotor blade segments can be connected to one another such that they cannot rotate or such that they can rotate with respect to one another, with the individual rotor blade segments each having one or more suitable contact surfaces which rest directly or indirectly on one another in the assembled state of the rotor blade, and such that at least one of the individual rotor blade segments can be tensioned by means of a tensioning apparatus, which can preferably be controlled and/or regulated, in the direction of the rotor centre of a wind energy installation, and/or can be attached indirectly or directly in a stressed manner to another rotor blade segment and/or to the blade connection and/or to the hub and/or to some other component of a wind energy installation.

This object also is achieved by a wind energy installation having a rotor which has at least one rotor blade, and having a generator for conversion of the mechanical energy of the rotor to electrical energy, with the rotor blade being formed in a plurality of parts in the longitudinal direction such that, when the rotor blade is in the assembled state, at least two rotor blade segments are fitted to one another one behind the other in the longitudinal direction, with the wind energy installation having a tensioning apparatus, which can preferably be controlled and/or regulated and by means of which at least one rotor blade segment, preferably that rotor blade segment which comprises the free end, specifically the tip of the rotor blade—blade tip segment—can be or is stressed in the longitudinal direction, preferably in the direction of the blade connection of the rotor blade.

A rotor blade for a wind energy installation is accordingly formed in a plurality of parts, preferably in two or three parts, with respect to the rotor blade longitudinal direction, specifically such that the individual rotor blade segments can be fitted to one another one behind the other in the longitudinal direction in order to assemble the rotor blade.

In this case, in each case at least two rotor blade segments can be connected to one another such that they cannot rotate or such that they can rotate with respect to one another, with the individual rotor blade segments each having one or more suitable contact surfaces which rest on one another when the rotor blade is in the assembled state. Furthermore, at least one of the individual rotor blade segments can be tensioned by means of a tensioning apparatus, which can preferably be controlled and/or regulated, in the direction of the rotor centre of a wind energy installation, and/or can be attached indirectly or directly in a stressed manner to another rotor blade segment and/or to the blade connection and/or to the hub and/or to some other component of a wind energy installation.

In particular, the formation of the rotor blade in a plurality of parts according to the invention allows the rotor blade to be manufactured in a plurality of segments with respect to its longitudinal direction, and for these rotor blade segments to be transported separately to the location where the wind energy installation is intended to be installed or at which the rotor blade is intended to be fitted to the already existing wind energy installation. After transportation of the rotor blade segments, they are accordingly assembled at the building site by means of suitable connecting means. The longitudinal extent of the rotor blade, which is the primary factor governing the transport facilities used, can accordingly be reduced as required. The longitudinal extent of the entire assembled rotor blade is accordingly split between the respective longitudinal extents of the rotor blade segments.

The formation of the rotor blade in a plurality of parts with respect to its longitudinal extent results, in particular during operation of the wind energy installation in considerable loads/forces being applied or acting in those areas in which the rotor blade segments are connected after assembly by the suitable connecting means, that is to say in the area of the contact surfaces which rest on one another in the assembled state. The tensioning apparatus according to the invention in this case means that these considerable loads/forces can be at least partially, and preferably completely, absorbed and/or dissipated.

The at least one contact surface of the respective rotor blade segment preferably runs at right angles to, that is to say transversely with respect to, the longitudinal direction of the rotor blade. In other words, in this case, the rotor blade is split laterally with respect to the longitudinal extent into the rotor blade segments. In principle, however, it is also feasible to make use of profiles of the respective contact surface at other angles, which are not at 90° with respect to the longitudinal direction. The contact surfaces, which rest on one another of adjacent rotor blade segments preferably run parallel to one another, of course. For example, the contact surfaces may be in the form of flanges.

In particular on the contact surfaces, the rotor blade segments may be connected to one another by detachable connecting means which, for example, may be nut and bolt combinations. Alternatively, however, it is, of course, also possible to use non-detachable connections, for example, depending on the material, adhesively bonded or welded joints. The nature of the connecting means used is in this case highly dependent on whether the rotor blade segments are connected to one another such that they can rotate or such that they cannot rotate with respect to one another.

In one particularly preferred embodiment, in which the rotor blade comprises, for example, three or more segments, provision is made for that rotor blade segment which comprises the blade tip (blade tip segment) to be attached to the immediately adjacent part such that it can rotate, for example by means of ball-type rotating joints, journals or the like. This rotor blade segment which is adjacent to the blade tip segment can in turn be connected to the next rotor blade segment, in the direction of the blade connection, such that they cannot rotate with respect to one another. As a person skilled in the art in this field will be aware, there are a large number of feasible options in this case.

The tensioning means associated with the rotor blade may for example be tensioning cables, tensioning chains, tensioning linkages, tie rods, tensioning tubes or the like. These are preferably part of a tensioning apparatus by means of which at least one rotor blade segment, preferably at least the blade tip segment, can be tensioned in the longitudinal direction, preferably in the direction of the blade connection of the rotor blade. The tensioning apparatus can preferably be controlled and/or regulated, and is preferably motor-driven.

The invention also relates to a wind energy installation which has one of the rotor blades according to the invention. In this case, the wind energy installation has a rotor which has at least one, and preferably three, rotor blades, a generator for conversion of the mechanical energy of the rotor to electrical energy, with the rotor blade being formed in a plurality of parts in the longitudinal direction in the described manner, and with at least one of the rotor blade segments, preferably that rotor blade segment which comprises the free end, specifically the rotor blade segment which comprises the tip of the rotor blade (blade tip segment) being stressed in the longitudinal direction by means of a tensioning apparatus, preferably in the direction of the blade connection of the rotor blade.

In this case, in one preferred embodiment, the tensioning apparatus of the wind energy installation may have at least one, and preferably a plurality of, tensioning means, in particular a tensioning cable, a tensioning chain, a tensioning linkage, a tie rod, a tensioning tube or the like, which is attached to one of the rotor blade segments, preferably to the blade tip segment, and which, after guidance along a specific path in the direction of the blade connection, is or can be attached indirectly or directly, in a stressed manner, to another rotor blade segment and/or to the blade connection and/or to the hub and/or to some other component of the wind energy installation.

As a person skilled in the art in this field will know, in addition to having one or more tensioning means, the tensioning apparatus preferably has further components as well. If the tensioning means are suitable for winding up, that is to say for example it is in the form of a cable, a chain, a linkage or the like, it is possible for example to use a preferably motor-driven winch or the like, onto which the tensioning means is wound, in order to produce adequate tension, by means of a suitable winding up process, between the rotor blade segment that is to be tensioned on the one hand, in particular the blade tip segment, and the blade connection and/or the hub and/or some other component of the wind energy installation, on the other hand. The winch is in this case preferably associated with the blade connection and/or the hub and/or the other component of the wind energy installation.

A further embodiment of the present invention is a method for operation of a wind energy installation having a generator for conversion of the mechanical energy of a rotor to electrical energy, with the rotor having at least one rotor blade which is formed in a plurality of parts with respect to its longitudinal direction, specifically by being split into at least two rotor blade segments, with at least two of the rotor blade segments of the rotor blade being connected to one another such that they can rotate in the assembled state of the rotor blade, and with the wind incidence angle of at least one of the rotor blade segments being adjusted for at least partial pitch control and/or for at least partial active stall control of the wind energy installation, by the at least one rotor blade segment being rotated, at least at times, relative to one of the other rotor blade segments.

In this case, only those rotor blade segments which are aerodynamically relevant are considered in the context of rotor blade segments into which the blade is split according to the invention and which are rotated relative to one another.

In this case, the method relates primarily to variable-pitch wind energy installations. However, in principle, the method can also be used for wind energy installations with active stall control.

As is known, in the case of active stall control, the stall effect (flow-separation effect) is controlled and monitored by blade rotation. In this case, the blade rotation is provided by a system similar to that for a pitch system. Nevertheless, there are two major differences with pitch control, as known by a person skilled in the art: the blades rotate in the opposite direction to pitch control for active stall control. Furthermore, a smaller angle is generally sufficient for active stall control than for pitch control, with the same closed-loop control process.

In the case of rotor blades formed with a plurality of parts, the method allows the pitch of at least one segment of the respective rotor blade to be adjusted individually relative to another segment, that is to say the incidence angle of the at least one rotor blade segment is adjusted or controlled individually and preferably independently of the incidence angle of another rotor blade segment. In the prior art, in contrast, the pitch of the entire rotor blade is adjusted uniformly.

The incidence angle of the at least one other rotor blade segment can, according to the invention, itself be adjusted individually, in particular relative to a further rotor blade segment. It is, of course, also feasible for it not to be possible to rotate the other rotor blade segment or segments around its or their longitudinal axis, but in fact to remain unchanged in its or their relative position with respect to the hub.

The at least one rotor blade segment is preferably rotated in order to control power output of the wind energy installation and/or in order to reduce the noise produced by the wind energy installation, relative to the other rotor blade segment, in particular at wind speeds below that at which the wind energy installation is shut down. The at least one rotor blade segment is accordingly preferably rotated relative to the at least one other segment within normal control operation. However, of course, this rotation can also initiate a braking process or a process for shutting down the wind energy installation.

In a further embodiment of the invention, the at least one rotor blade segment can be rotated in a manner which can be controlled and/or regulated with respect to the at least one other rotor blade segment, in which case the at least one rotor blade segment may assume a plurality of different rotation positions relative to the at least one other rotor blade segment, but at least more than two rotation positions.

In a further embodiment, the at least one rotor blade segment can be rotated indirectly or directly relative to the other rotor blade segment as a function of at least one operating parameter of the wind energy installation and/or of the wind strength and/or of the noise produced by at least one rotor blade during operation.

In particular, the at least one rotor blade segment can be rotated indirectly or directly relative to the at least one other rotor blade segment as a function of the preferably instantaneous power output of the wind energy installation and/or of the preferably instantaneous rotor rotation speed and/or of the preferably instantaneous rotor rotation speed acceleration and/or of the preferably instantaneous load on at least one rotor blade.

In this case, that rotor blade segment which comprises the tip of the rotor blade (blade tip segment) is preferably rotated, at least at times, relative to the at least one other rotor blade segment, in particular along the longitudinal axis of the blade tip segment.

In a further special embodiment, the pitch of the at least one rotor blade segment is adjusted only when, in appropriate wind conditions, the rating of the installation is reached. This embodiment according to the invention in this case has the advantage that the noise of the wind energy installation can be reduced in comparison to known wind energy installations. As is known, noise is produced aerodynamically and the noise becomes louder the higher the speed of the respective aerofoil section is in the wind. The noise is effectively reduced, without having to greatly reduce the power output of the installation, by rotation of the blade tip segment out of the wind even before the rating is reached.

This is the case in particular when the length of the blade tip segment is rather short in comparison to the overall length of the rotor blade, preferably less than one third of the overall length, preferably less than one quarter, and particularly preferably less than one eighth.

Thus, as described above, at least one of the rotor blade segments, preferably that rotor blade segment which comprises the tip of the rotor blade (blade tip segment) can be rotated, in a manner which can be controlled and/or regulated, with respect to at least one other rotor blade segment, preferably with respect to that rotor blade segment which is immediately adjacent to the blade tip segment, and in particular the wind incidence angles of the various rotor blade segments can be adjusted independently of one another.

For this purpose, in a further embodiment, the wind energy installation may have a shaft which can rotate, in particular an essentially rigid shaft, preferably a linkage which can rotate, a tube which can rotate or the like, which is guided at least in places along the longitudinal direction of the rotor blade in order to transmit torques to one or more rotor blade segments, preferably to the blade tip segment, preferably in the interior of the rotor blade, and is connected indirectly or directly, such that they cannot rotate with respect to one another, to one or more of the rotor blade segments, preferably to the blade tip segment.

The shaft can be driven and can be caused to rotate about its longitudinal axis via a suitable motor drive, which can be controlled and/or regulated, thus moving or rotating that rotor blade segment which is connected to the shaft such that they cannot rotate with respect to one another, for example the blade tip segment, relative to one of the other rotor blade segments.

The shaft is connected, preferably in the manner described above, to at least one of the rotor blade segments, in particular to the blade tip segment, such that they cannot rotate with respect to one another, although it is mounted such that it can rotate on one of the other rotor blade segments and/or on some other component of the wind energy installation, for example the hub.

By way of example, when the value of the actual power output from the wind energy installation during operation is less than the rating of the wind energy installation, the at least one rotor blade segment, preferably the blade tip segment, can be rotated relative to the other rotor blade segment, specifically such that the individual rotor blade part is rotated at least partially, and preferably completely, out of the wind, in particular in order to reduce the noise emissions from the at least one rotor blade segment.

As described above, the wind energy installation can also be operated by using suitable noise sensors to measure the noise which is produced by at least one rotor blade and/or one rotor blade segment, and by at least one of the rotor blade segments being moved relative to another rotor blade segment as a function of this noise level, for example by being rotated at least partially out of the wind, in order to reduce the noise.

In a further embodiment of the invention, means which are arranged on at least one rotor blade for guidance and/or reduction of air flows and/or vortices in the area of the abutting edges of the rotor blade segments, in particular one or more winglets, are regulated and/or controlled indirectly or directly as a function of at least one operating parameter of the wind energy installation and/or of the wind strength and/or of the noise produced by at least one rotor blade during operation, in particular so as to reduce vortices in the area of the abutting edges of the rotor blade segments and/or inadvertent pressure equalizing flows in the area of the gaps between the abutting edges.

BRIEF DESCRIPTION OF THE DRAWINGS

Further features of the present invention will become evident from the attached patent claims, from the following description of one preferred exemplary embodiment, and from the attached drawings, in which:

DETAILED DESCRIPTION OF PREFERRED EMBODIMENTS

Figure 1:
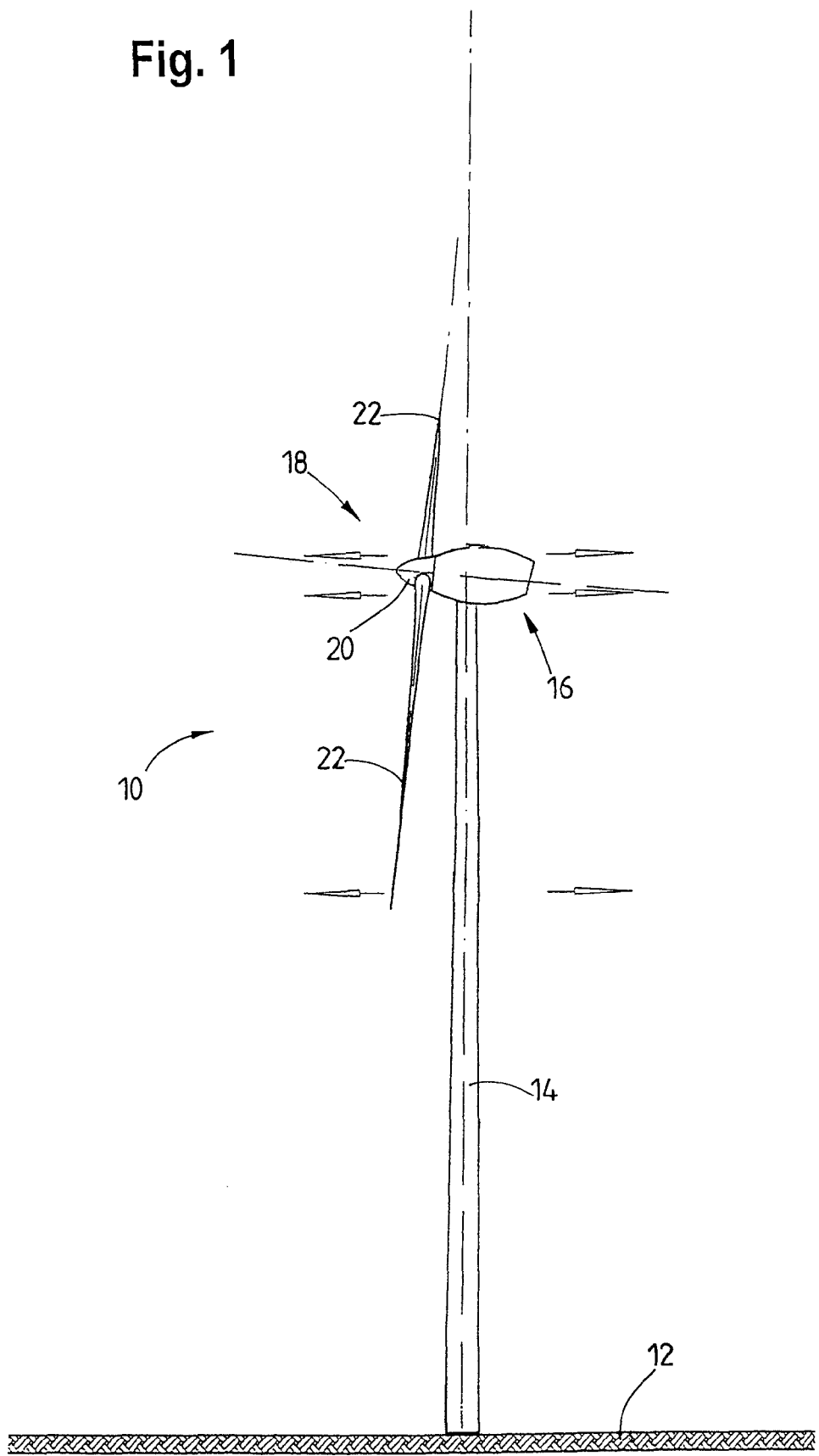
FIG. 1 shows a side view of a wind energy installation according to the invention.

FIG. 1 illustrates a wind energy installation 10 which, at the upper end of a vertical tower 14 that is arranged on a horizontal ground base 12, has a pod 16 arranged at the top of the tower 14. As a person skilled in the art in this field knows, a wide range of embodiments are feasible for the detailed design of a tower for a wind energy installation. The invention is, of course, not restricted to the truncated conical form of the tower 14 described in the drawing.

A rotor 18, which has a hub 20, is arranged at an end of the pod 16 facing the wind. Three rotor blades 22 are connected to the hub 20, with the rotor blade roots of the rotor blades 22 being inserted into appropriate openings in the hub 20, and being connected to the hub 20 in a known manner.

The rotor 18 rotates about an axis which is inclined slightly upwards with respect to the horizontal. As soon as wind strikes the rotor blades 22, the rotor 18 together with the rotor blades 22 is caused to rotate about the rotor axis. The movement of the rotor shaft is converted to electrical power by a generator, which is not illustrated but is arranged within the pod 16.

The rotor blades 22 cover a circular area during rotation.

The fundamental design of the wind energy installation 10 with an at least approximately horizontal rotor axis is known in the prior art, and this will therefore not be described in detail.

Figure 2:
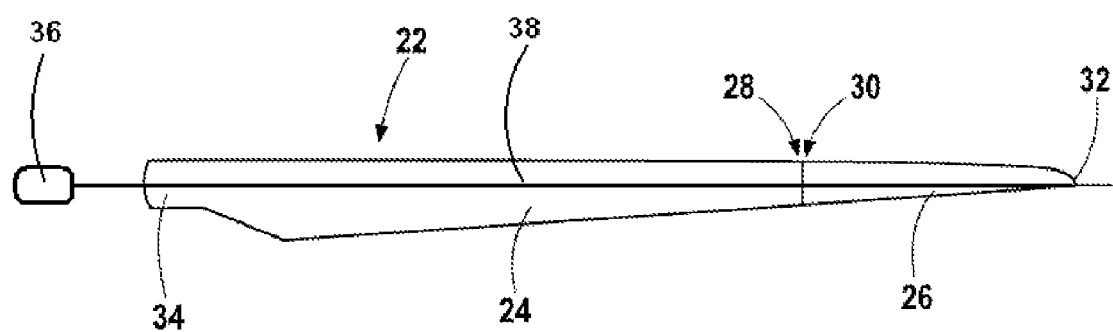
FIG. 2 shows a rotor blade of the wind energy installation from FIG. 1 in a first position.
Figure 3:
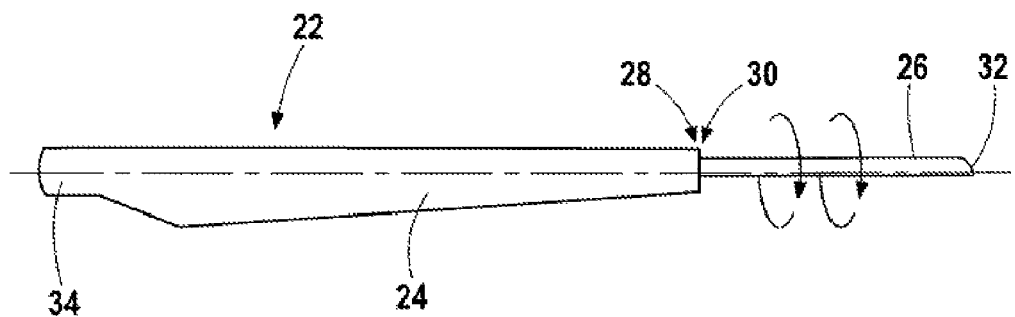
FIG. 3 shows the rotor blade from FIG. 2 in a second position.

It is particularly important for each of the three rotor blades 22 of the wind energy installation 10 to be formed from a plurality of parts, in the manner illustrated in FIGS. 2 and 3.

In the illustrated exemplary embodiment, the rotor blade 22 from FIG. 2 has a first segment 24, as well as a second segment 26. The two segments 24, 26 are fitted to one another in the longitudinal direction of the blade, in other words the rotor blade 22 is split into the segments 24, 26 laterally with respect to the longitudinal direction.

Each segment 24, 26 has a respective contact surface 28 and 30, which rest on one another in the illustrated assembled state of the rotor blade 22. The two segments 24, 26 are in this case connected at the contact surfaces 28, 30 via a rotating joint connection, such that the segment 26 which comprises the blade tip 32 of the rotor blade 22 can rotate relative to that segment 24 which has the blade root 34 of the rotor blade 22.

A tensioning apparatus, which is not illustrated, braces the individual rotor blade segments 24, 26 to one another and to the blade connection in the longitudinal direction. For this purpose, tensioning cables 38, which are attached in the blade tip end 32 area, that is to say in the interior of the segment 26, and are guided in the rotor blade longitudinal direction to the blade connection of the rotor blade, run in the interior of the segments 24, 26. The tensioning cables 38 are attached and/or wound up on a winch 36 in the area of the blade connection. If the tensioning cable 38 is wound up in an appropriate manner onto the winch 36, this makes it possible to adjust those tension forces with which the blade tip segment 26 is forced against the blade root segment 24 or against the blade connection.

Furthermore, the rotor blade 22 can be rotated in its entirety by means of a motor-driven drive device about its longitudinal axis, in order to adjust the incidence angle of the entire rotor blade 22 in a uniform manner with respect to the wind, and/or to control it for the known pitch control purposes. Furthermore, the blade tip segment 26 can also be rotated individually relative to the blade root segment 24, thus making it possible to individually control and/or regulate the wind incidence angle of this segment 26, specifically such that its pitch can be partially adjusted.

The wind energy installation 10 has a control and/or regulation device for suitable regulation and/or control of the incidence angle of the segment 26 and/or the incidence angle of the entire rotor blade 22.

The wind incidence angle of the rotor blade segment 26 can therefore be adjusted for at least partial pitch control of the wind energy installation 10, by rotating the at least one rotor blade segment 26, at least at times, relative to the other rotor blade segment 24.

In this case, the blade tip segment 26 is rotated relative to the other rotor blade segment 24 in order to control the power output of the wind energy installation 10 and/or in order to reduce the noise produced by the wind energy installation 10, to be precise primarily at wind speeds below the speed at which the wind energy installation 10 is shut down.

The blade tip segment 26 can be rotated relative to the other rotor blade segment 24 indirectly or directly as a function of at least one operating parameter of the wind energy installation 10 and/or of the wind strength and/or of the sound produced by at least one rotor blade 22 during operation. By way of example, the regulation process can be carried out indirectly or directly by rotation relative to the other rotor blade segment 24, as a function of the preferably instantaneous power output of the wind energy installation 10 and/or of the preferably instantaneous rotor rotation speed and/or of the preferably instantaneous rotor rotation speed acceleration and/or of the preferably instantaneous load, specifically the wind load, on at least one rotor blade 22.

FIG. 2 shows the rotor blade 22 in a position in which the blade tip segment 26, in an initial position, is at a fixed rotation angle of 0° with respect to the blade root segment 24. In this 0° position, the blade tip segment 26 is aligned with the blade root segment 24.

In contrast, FIG. 3 shows the rotor blade 22 in a different position, in which the blade tip segment 26 has been rotated through a specific rotation angle, in this case through an angle of 90°, with respect to the blade root segment 24.

LIST OF REFERENCE SYMBOLS

10. Wind energy installation
12. Ground base
14. Tower
16. Pod
18. Rotor
20. Hub
22. Rotor blade
24. Segment
26. Segment
28. Contact surface
30. Contact surface
32. Blade tip end
34. Blade root

The invention claimed is:

1. A rotor blade for a wind energy installation, in which the rotor blade (22) is formed in at least two parts, with respect to the rotor blade longitudinal direction, in order to temporarily reduce the longitudinal extent of the rotor blade (22) during rotor blade transportation, wherein:
   individual rotor blade segments (24, 26) are fitted to one another, one behind the other in the longitudinal direction, in order to assemble the rotor blade (22);
   in each case at least two of the rotor blade segments (24, 26) are rotatably or non-rotatably connected to one another;
   the individual rotor blade segments (24, 26) each have at least one suitable contact surfaces (28, 30) which rest directly or indirectly on one another in the assembled state of the rotor blade (22); and
   at least one of the individual rotor blade segments (24, 26) is tensioned by means of a tensioning apparatus, which is controlled and/or regulated, in the direction of the rotor center of a wind energy installation (10), and/or is attached indirectly or directly in a stressed manner to another rotor blade segment (24, 26) and/or to the blade connection and/or to a hub (20) and/or to some other component of a wind energy installation (10).

2. The rotor blade according to claim 1, wherein the at least one contact surface (28, 30) runs at an angle transverse to the longitudinal direction of the rotor blade (22).

3. The rotor blade assembly according to claim 2, wherein the angle is a right angle.

4. The rotor blade according to claim 1, wherein the individual rotor blade segments (24, 26) are additionally connected to one another by detachable connecting means.

5. The rotor blade according to claim 4, wherein the at least one contact surface (28, 30) runs at an angle transverse to the longitudinal direction of the rotor blade (22).

6. The rotor blade assembly according to claim 5, wherein the angle is a right angle.

7. A wind energy installation comprising:
- a rotor (18) which has at least one rotor blade (22), with the rotor blade (22) being formed in a plurality of parts in the longitudinal direction wherein, when the rotor blade (22) is in the assembled state, at least two rotor blade segments (24, 26) are fitted to one another one behind the other in the longitudinal direction;
- a tensioning apparatus, which is controlled and/or regulated and by means of which at least one of the rotor blade segments (26) is stressed in the longitudinal direction; and
- a generator for conversion of the mechanical energy of the rotor (18) to electrical energy.

8. The wind energy installation according to claim 7, wherein at least one of the rotor blades (22) has means which is controlled and/or regulated for guidance and/or for reduction of air flows and/or vortices in the area of the abutting edges of the rotor blade segments (24, 26).

9. The wind energy installation according to claim 7, wherein the wind energy installation (10) further comprises a drive by means of which a shaft rotates along the shaft longitudinal axis.

10. The wind energy installation according to claim 7, wherein the rotor blade segment that is stressed is the rotor blade segment (26) that comprises the free end and the tip of the rotor blade (22) blade tip segment and is stressed in the direction of the blade connection of the rotor blade (22).

11. The wind energy installation according to claim 10, wherein the tensioning apparatus further comprises at least one tensioning means which is attached to the blade tip segment (26) and which, after guidance along a specific path in the direction of the blade connection, is attached indirectly or directly, in a stressed manner, to another blade segment (24) and/or to the blade connection and/or to a hub (20) and/or to some other component of the wind energy installation (10).

12. The wind energy installation according to claim 11, wherein the tensioning means is selected from the group consisting of a tensioning cable, a tensioning chain, a tensioning linkage, a tie rod, and a tensioning tube.

13. The wind energy installation according to claim 7, wherein at least one of the rotor blade segments (26) is rotated relative to at least one other rotor blade segment (24), and in that the at least one rotor blade segment (26) assumes at least two different rotation positions relative to the at least one other rotor blade segment (24).

14. The wind energy installation according to claim 13, wherein the rotor blade segments (26) that is rotated relative to at least one other rotor blade segment (24) is the rotor blade segment which comprises the tip of the rotor blade (22) blade tip segment (26), and is rotated relative to that rotor blade segment (24) which is immediately adjacent to the blade tip segment.

15. The wind energy installation according to claim 13, wherein wind incidence angles of at least one other of the rotor blade segments (24) are adjustable, independently of one another.

* * * * *